Dec. 26, 1961  G. T. RANDOL  3,014,460
PNEUMATICALLY-ACTUATED BOOSTER FOR VEHICULAR STEERING SYSTEMS
Filed March 23, 1959  3 Sheets-Sheet 1
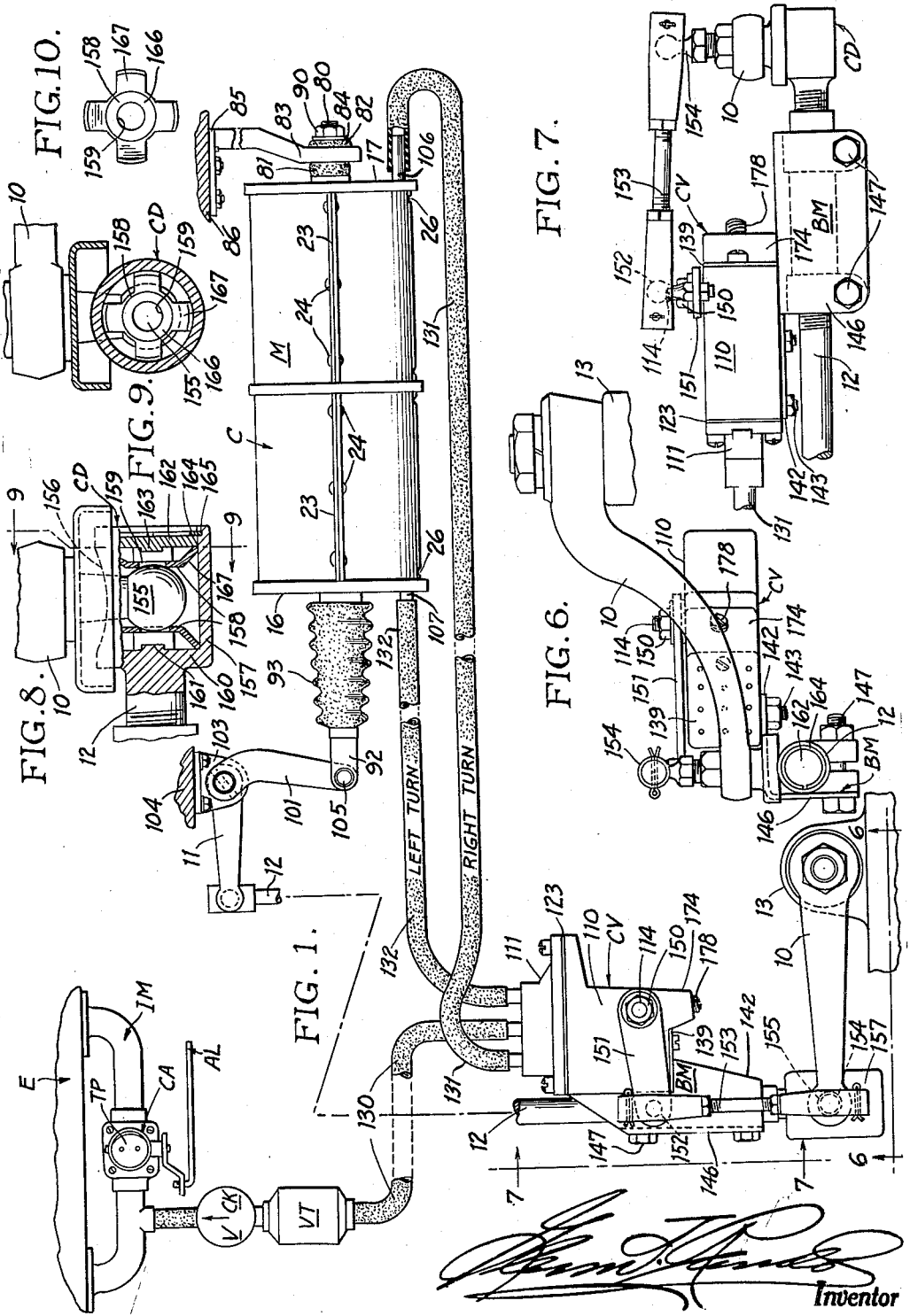
Inventor Dec. 26, 1961 G. T. RANDOL 3,014,460
PNEUMATICALLY-ACTUATED BOOSTER FOR VEHICULAR STEERING SYSTEMS
Filed March 23, 1959 3 Sheets-Sheet 2
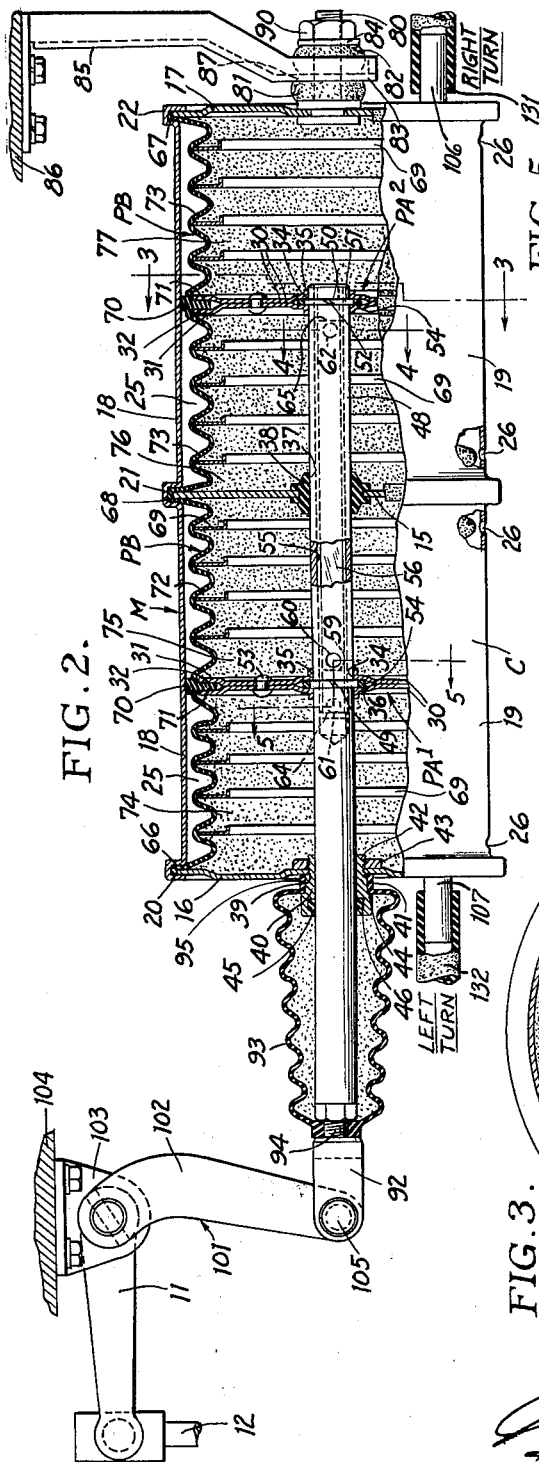
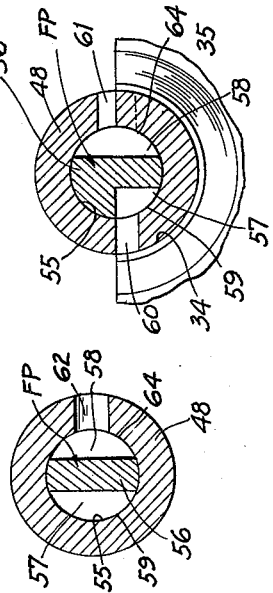
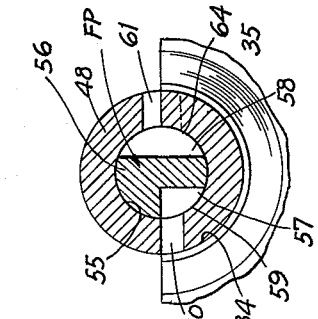
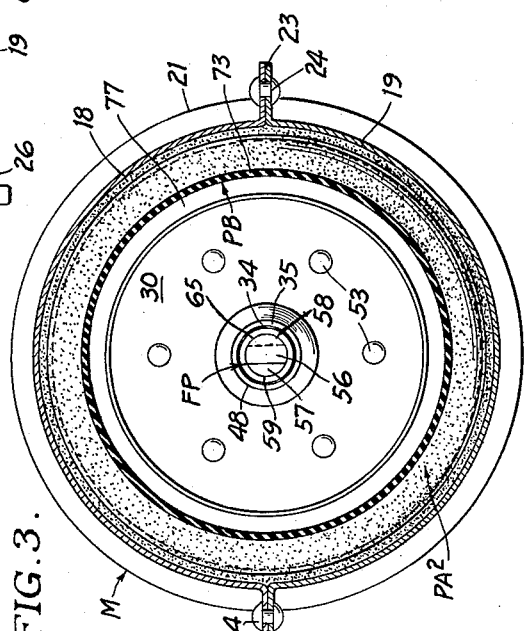
Inventor

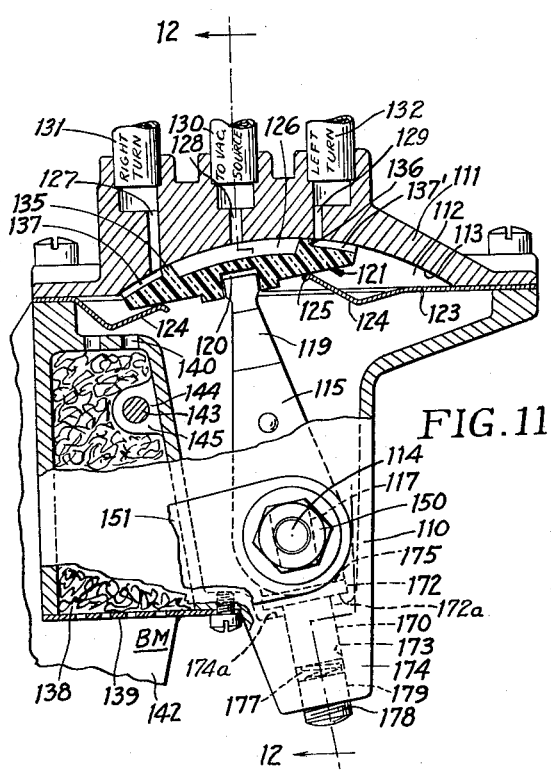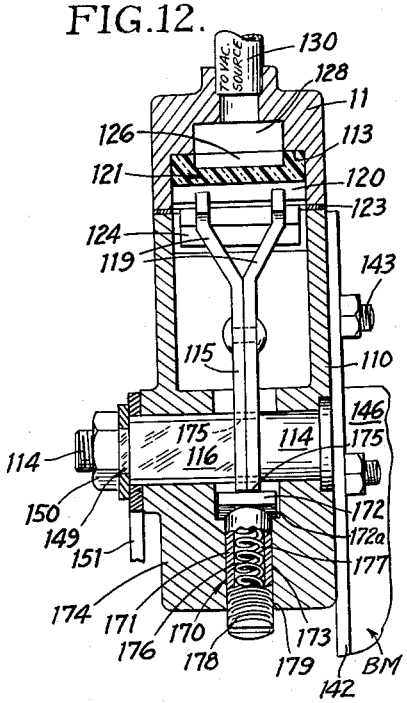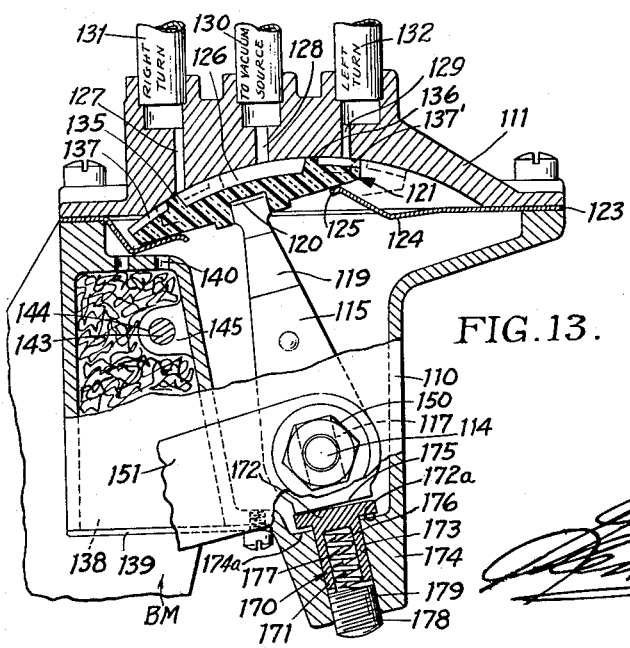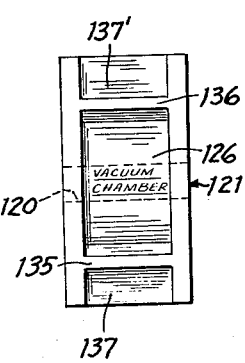

3,014,460
PNEUMATICALLY-ACTUATED BOOSTER FOR
VEHICULAR STEERING SYSTEMS
Glenn T. Randol, 2nd Ave. and Paull St., Box 275,
Mountain Lake Park, Md.
Filed Mar. 23, 1959, Ser. No. 801,239
9 Claims. (Cl. 121—48)

My invention relates generally to automotive power steering systems and particularly to pressure differential (vacuum) power boosters for such steering systems.

The general object of the present invention is to provide a novel tandem-type fluid pressure motor wherein three stationary heads and a pair of movable walls are connected by a flexible bellows which cooperates with said stationary heads to form two pairs of cooperating chambers therebetween, and to provide novel follow-up control valve mechanism for selectively controlling communication of said pairs of chambers with atmosphere and with a source of vacuum, to thus control substantially simultaneous energization of said movable walls to activate said motor.

A further object is to provide such a motor with an axially bored piston rod which projects from one or said movable walls through the medial stationary head, thence through the other movable wall and confronting end stationary head to the exterior, said piston rod being provided with a cylindrical partition member having on opposite sides a longitudinal flute or groove in air-tight sealed relation with respect to said axial bore, said grooves being effective to interconnect each of said pairs of chambers whereby differential pressures are effective across said movable walls to activate said motor.

A further object is to provide a tandem motor construction of the character referred to wherein the pair of movable walls are each provided with a vacuum power chamber to one side thereof and with an atmospheric chamber on the other sidet hereof, which chambers are selectively connectible in pairs by said follow-up control valve mechanism to a source of vacuum production and to atmosphere to activate said motor.

A further object is to provide such a motor with a novel cylindrical casing comprising a pair of longitudinal semi-circular shells which are formed with three longitudinally spaced internal semi-circular channels or grooves which receive the peripheral marginal portions of the three stationary heads and complemental circular beads or ridges formed on the exterior of said bellows to lock the extremities and intermediate circular portion of the bellows to the stationary heads in a unitary assembly when the two semi-circular shells are assembled as by rivets or bolts projecting through confronting marginal outstanding flanges terminating the longitudinal ends thereof, said shells being provided with a plurality of air-slots to maintain the interior of said casing at atmospheric pressure. The invention contemplates that the flexible bellows have means for properly subtending it when vacuum is present in the pair of cooperating motor chambers thus rendering differential pressures effective for moving said movable walls simultaneously while preventing radial collapsing of the bellows. A further object is to provide a pair of atmospheric chambers between said three stationary heads, wherein said bellows is operative under protection from damage as could result from objects thrown up from the ground wheels of the motor vehicle and weather conditions as well.

A further object is to provide such a motor with novel resilient means for anchoring one end thereof to a support member on the vehicle and tending at all times to restore the motor and connected steering linkage to a normal "neutral" operating position corresponding to straight line steering of the vehicle.

Another object is to provide the aforesaid follow-up control valve mechanism with an oscillatory element movable in intimate engagement with a complemental working surface for maintaining an air-tight seal therebetween, such intimate engagement being influenced jointly by novel spring means and pressure differential.

An object related to the object immediately preceding is to incorporate in said valve mechanism a spring-loaded detent mechanism for constantly urging said movable valve element toward its neutral steering position in cooperation with the action of said resilient anchoring means of said motor.

Another special feature of my invention resides in the novel use of spring centering means in the pitman arm connection with the drag link cooperating with the aforesaid valve detent mechanism to provide limited operating movement for said valve mechanism to control activation and inactivation of said motor, and to urge the dirigible wheels of the vehicle toward neutral driving position.

Another important feature is to provide such a motor with a peripheral integrated bead or flange on the exterior of said bellows in circular alignment with each of the movable walls in intimate sliding engagement with the interior of said casing to assist in maintaining the movable walls in their proper axial operating line of movement within said casing thus insuring against tilting or angulation incident to any sagging of the bellows or forces tending to displace said movable walls out of their true path of operating movement.

A further more specific object is to provide novel vacuum-powered steering mechanism for automotive vehicles and the like which may be readily marketed as an accessory for installation on after-market vehicles, which is simple and of low-cost construction, and easily installed on motor vehicles without altering the existing manual steering system with which the vehicle is originally equipped.

In the interest of brevity, other objectives and salient features will be noted hereinafter in lieu of presenting them categorically in this general statement of the nature of my invention. A more comprehensive understanding of the advantages of my invention and its mode of operation may be derived from the detailed description thereof to follow with reference to the accompanying drawings in which:

FIGURE 1 is a plan view, portions of which are schematically depicted, of the steering linkage of a motor vehicle and the like incorporating vacuum-power steering mechanism constructed in accordance with the present invention;

FIGURE 2 is a longitudinal horizontal, with portions in elevation, section on an enlarged scale of the servomotor illustrated in FIGURE 1;

FIGURE 3 is a transverse sectional view taken along the line 3—3 of FIGURE 2 showing one of the tandem power assemblies;

FIGURE 4 is another transverse sectional view taken on an enlarged scale along the line 4—4 of FIGURE 2 showing details of the fluid passageway means incorporated in the servomotor output member;

FIGURE 5 is another transverse sectional view on an enlarged scale taken along the line 5—5 of FIGURE 2 showing further details of the fluid passageway means in the output member of the servomotor;

FIGURE 6 is an end elevation of the follow-up control valve mechanism taken from line 6—6 of FIGURE 1;

FIGURE 7 is a side elevation of the follow-up control valve mechanism taken from the line 7—7 of FIGURE 1;

FIGURE 8 is a longitudinal section showing details of the spring-loaded centralizing mechanism which interconnects the steering arm and a part of the steered parts of the vehicle;

FIGURE 9 is a transverse sectional view taken along the line 9—9 of FIGURE 8 showing further details of the centralizing mechanism;

FIGURE 10 is a view of one of the two springs per se employed in the centralizing mechanism;

FIGURE 11 is a plan view of the follow-up control valve mechanism with portions of the casing broken away to expose the working parts shown in "neutral" position corresponding to FIGURE 1 depiction;

FIGURE 12 is a transverse sectional view taken along the line 12—12 of FIGURE 11 showing particulars of the movable element of the control valve and actuating arm therefor;

FIGURE 13 is a view similar to FIGURE 11 but showing the parts operated to one of the operating "on" positions of control; and FIGURE 14 is a view of the movable valve element per se showing the central vacuum chamber and the air chambers at each end thereof.

Referring now to FIGURES 1 and 2 wherein like reference characters refer to like and corresponding parts throughout the several views, the illustrative embodiment of my invention is disclosed in connection with a swingable steering pitman arm 10, idler arm 11 and interconnecting drag link 12, and which are associated with the usual steering column, steering shaft and steering wheel, and a worm and sector connection framentarily indicated by its housing at 13 between said steering shaft and pitman arm to swing the latter to impart corresponding reciprocable movements to the drag link and thus change the path of rotation of the dirigible vehicle wheels to steer the vehicle in response to manual force applied to the steering wheel as is understood.

*Tandem-type pressure differential motor*

The pressure differential motor generally designated M comprises: a medially disposed stationary head 15 and a pair of longitudinally spaced end stationary heads 16, 17, one on each side of said medial head. These three heads are secured in their respective spaced relation by a cylindrical casing C which includes a pair of longitudinal semi-circular shells 18, 19 having correspondingly spaced internal grooves 20, 21 and 22 for reception of the peripheral marginal portions of said stationary heads, said shells terminating along their longitudinal end marginal portions in outturned flanges 23 which are secured in confronting pairs on opposite sides of the axis of said motor by fasteners such as, for example, rivets 24, to combine said shells and stationary heads in a unitary assembly. An atmospheric chamber 25 is provided on each side of the medial stationary head in the interior of said assembled shells with respect to the end stationary heads, and a plurality of openings or slots 26 are provided through the wall of said casing to constantly vent said chambers to atmosphere.

Movably mounted in each of the atmospheric chambers 25 is a power assembly or member which for convenience in describing the structure thereof will hereinafter be designated the forward power assembly or member PA¹ and the rear power assembly or member PA². Each of these power assemblies comprise: a pair of identical circular plates 30 disposed back-to-back in juxtaposed relation with their peripheral marginal portions offset outwardly from one another at 31 to produce an external annular channel 32 therebetween, and the terminus of said offsets being formed as an outturned flange 33 to stiffen said plates. A central circular opening 34 is provided through each pair of plates with the marginal portions of said openings offset outwardly from one another at 35 to form an internal annular channel 36 therebetween. Coaxially disposed through the central portion of the medial stationary head 15 is a circular opening 37 equipped with a ring-like flexible sealing member 38 and a circular opening 39 through the forward stationary head 16, the latter opening carrying an axially bored bearing collar 40 shouldered at 41 with its internal reduced diameter portion 42 threaded for reception of a lock nut 43 thereon to secure said collar in air-tight relation with respect to said forward head. Adjacent the outer side of said opening is an external annular groove 44 on the said collar which also carries an internal annular groove 45 spaced forwardly from the external groove 44, and a ring-like packing 46 is mounted in said groove 45. Co-extensive with the rearward power assembly PA² and projecting through the sealing member 38 carried by the medial stationary head 15, the opening 34 in the forward power assembly PA¹ and the packing 46 to the exterior of the forward stationary head 16 is a rigid output or pressure-transmitting member disclosed herein as a piston rod 48 which is provided with a pair of longitudinally spaced external grooves 49, 50 in circular alignment with the annular channels 36 in the power members PA¹ and PA². Each of these grooves being adapted to receive a metallic contractible thrust ring 51 angularly split at 52 to effect a unitary assembly of said power members on the piston rod 48 when the plates 30 are tightly assembled in juxtaposed relation as by rivets 53, or otherwise. Also carried in each of said channels 36 in encircling relation to its thrust ring, is a pliant packing member 54 to seal off the confronting sides of the pair of plates from said thrust rings and therefore from the exterior of said juxtaposed plates. A blind axial bore 55 is formed in said piston rod extending from the latter's end connected to the power member PA² to a point beyond the forward side of the front power member PA¹. Incorporated in said axial bore is fluid passageway or distributing means generally designated FP comprising a fluted cylindrical member 56 pressed into said axial bore in air-tight sealed relation with respect thereto and having longitudinal surface passageways 57, 58 on opposite sides thereof, passageway 57 extending from the right end of said piston rod to a shoulder indicated at 59 to the immediate right of power member PA¹ and connected to the exterior of said piston rod via a cross passageway 60 through the wall of said piston rod, while the other longitudinal passageway 58 extends from a point adjacent the forward side of power member PA² to an adjacent point forward of the other power member PA¹, this latter passageway being connected to the exterior of said piston rod via cross passageways through the wall of said piston rod indicated at 61, 62. It will be noted on an inspection of FIGURES 2, 3 and 4 that these opposed longitudinal passageways between member 56 and the piston rod 48 are preferably formed by flats on opposite sides of said member 56, the flat forming the passageway 57 terminates in said shoulder 59, while the other flat forming the passageway 58 is defined by end shoulders 64, 65 for an important purpose as will appear.

A flexible power bellows generally designated PB formed of rubber or any other suitable material is provided between the three stationary motor heads 16, 15 and 17. The ends of said bellows terminate in a sealing bead 66, 67, and intermediate thereof is a medially disposed external sealing bead 68, bead 67 which is received in groove 20, bead 68 in groove 21 and bead 67 in groove 22 formed in the semicircular shells 18, 19 whereby the bellows is anchored between the peripheries of the three stationary heads and circularly aligned grooves 20, 21 and 22 as best demonstrated in FIGURE 2. The outward flexible folds of said bellows are each preferably provided with a subtending metallic ring 69 to prevent radial collapse inwardly of the bellows when vacuum is present in the aforesaid pairs of motor chambers within the bellows. In circularly aligned disposition with respect to a medial point between said beads 66, 68 and beads 67, 68, are external and internal circular portions or flanges 70, 71 respectively integral with said bellows, the flanges 70 being adapted to slidably engage the inner cylindrical surface of the shells 18, 19 and the internal flanges 71 are each received into one of the channels 32 between the offsets 31 in the plates 30 forming the power assemblies PA¹ and PA², under compression to anchor the power assemblies to the medial portion of their respective flexible portions designated 72, 73 of the bellows for movement together. The power member PA¹ connected to the flexible portion 72 divides the interior thereof in two variable pressure or power chambers 74, 75 and the other flexible portion 73 connected to the power member PA² divides the interior thereof in two variable pressure or power chambers 76, 77, power chambers 74, 76 being interconnected by passageways 58, 61 and 62 and power chambers 77, 75 being interconnected by passageways 57, 60. Accordingly, the two power chambers 74, 76 cooperate in unison and the other two power chambers 77, 75 cooperate in unison. When the power assemblies PA¹ and PA² are disposed in their respective normal medial released positions shown in FIGURE 2, all four chambers 74, 75, 76 and 77 are vented to atmosphere via a novel type follow-up control valve mechanism generally designated CV to be fully described. With all four of said motor chambers vented to atmosphere, the motor is inactivated; and when either pair of cooperating chambers is connected to a vacuum source, differential pressures are set up across the pair of power assemblies to move the same in the selected direction by atmospheric pressure effective in the other pair of cooperating chambers, to activate said motor. Accordingly, the function of said control valve mechanism is to activate and inactivate said motor by controlling sub-atmospheric conditions substantially simultaneously in the pairs of cooperating chambers aforesaid to produce differential pressures on opposite sides of the pair of power assemblies, and to equalize pressures on said assemblies, respectively.

The rear stationary head 17 carries a mounting pin 80 rigid with the central portion thereof which is yieldably connected as by ring-like rubber collars 81, 82 disposed between a flange 83 adjacent the outer side of said head and a washer 84 on opposite sides of a bracket member 85 secured to a fixed portion on the vehicle as at 86. The bracket has a hole at 87 coaxially disposed with respect to holes 88, 89 through the collars, through which the pin projects beyond the said washer to receive a nut 90 on its terminating threaded portion 91 to place sufficient tension on the rubber collars to resiliently maintain the motor in a longitudinal position with respect to its axis corresponding to straight ahead driving of the vehicle, said collars serving the additional function of influencing the dirigible wheels of the vehicle toward straight ahead driving from either a right or left direction of power assistance from said motor.

The end of the portion of the piston rod 48 projecting forwardly of the forward stationary head 16 is fitted with a clevis 92 which is adjustable to vary the length of said rod, and disposed between said clevis and the forward side of said head 16 is a flexible protecting boot 93 encircling the exposed portion of said piston rod with its forward smaller end tightly surrounding the threaded shank 94 of said clevis and its larger end formed with an internal bead 95 which engages the external groove 44 aforesaid whereby reciprocable movement of the piston rod 48 is accommodated.

A bell-crank lever 101 comprising the aforesaid idler arm 11 and an arm 102 normal thereto, is pivotally mounted on a bracket 103 secured to a fixed portion on the vehicle as at 104. Arm 102 is pivotally connected at 105 to the clevis 92 for unison oscillatory movement with the piston rod 48.

A rigid tube 106 is disposed through the wall of the head 17 and another rigid tube 107 is disposed through the head 16 whereby the motor chambers 77 and 74 respectively are placed in communication with the exterior of said motor casing.

*Follow-up control valve mechanism*

The control valve CV comprises: a hollow valve body or housing 110 having an opening to the exterior and a cover 111 for said opening and provided with a valve guideway or channel 112 of rectangular cross section and with its bottom surface forming a valve seat 113 arcuate with the center of the arc in the axis of a valve shaft 114, which extends transversely through the body 110 and has an arm 115 keyed thereto as by flats 116 cooperating with complemental flats 117 forming a portion of an opening 118 through the lower keyed end of said arm. The end of the arm opposite its keyed end terminates in two diverging prongs or extensions 119 which engage a transverse recess 120 in the underside of a movable valve element or shoe 121 whose outer surface is arcuate to fit the seat 113. Spring means 122 comprising a rectangular frame or web 123 is disposed between the valve body and cover with inwardly projecting angular extensions 124 whose confronting ends lie on opposite sides of the arm prongs 119, and are formed with arcuate terminating portions 125 bearing against the underside of said valve element to maintain the latter in intimate sliding contact with its complemental valve seat 113.

The valve shoe 121 may be made of any suitable material. Preferably is molded of material commercially known as "Durez." This material is preferably impregnated with suitable lubricant such as graphite. The valve element 121 has a preferably rectangular vacuum recess or chamber 126 in its outer arcuate surface (see FIGURE 11) for cooperating with ports 127, 128 and 129 in the valve housing cover and terminating at the valve seat 113, the port 128 being connected by suitable conduit means 130 to a source of vacuum such as, for example, the inlet-manifold IM of the vehicle engine, while port 127 is connected by suitable conduit means 131 to tube 106 on the rear end of the motor, and port 129 is connected by suitable conduit means 132 to the tube 107 on the forward (left) end of said motor whereby relative arcuate movement of the valve element 121 with respect to its valve seat 113 selectively connects the ports 127, 129 to vacuum and to atmosphere to activate the motor to assist in effecting a right or left turn of the dirigible wheels of the motor vehicle and to place said ports in communication with the atmosphere upon return of the dirigible wheels to straight ahead driving of the vehicle.

Interposed in the conduit means 130 is a check-valve generally designated CK and a vacuum accumulator or tank generally designated VT in that order from the intake-manifold IM connection. The check-valve functions to prevent loss of stored vacuum in the tank and the latter serves to maintain substantially uniform sub-atmospheric conditions in the tank despite variable pressure conditions in the intake-manifold and for limited energization of the servomotor M during those times when the throttle plate TP of the carburetor CA shown in FIGURE 1 is opened to speed the engine E fragmentarily depicted in this figure. Thus, when parking the vehicle requiring intermittent opening and closing of the engine throttle in response to operating the accelerator linkage AL to maneuver the vehicle into the parking space, the stored vacuum in tank VT enables activation of the servomotor M to assist manual operation of the steering system as is understood.

The valve element 121 also includes a pair of spaced transversely disposed working lands 135, 136 which separate said vacuum chamber 126 from air chambers 137, 137' respectively formed in the arcuate surface of said valve element in cooperation with valve channel 112, said chambers being normally disposed as shown in FIGURE 11 to connect ports 127, 129 respectively to the interior of the valve housing.

The interior of the valve housing 110, below the valve channel 112, is provided with an air inlet chamber 138 closed at its outer end by a perforated lid 139 and connected at its inner end with the interior of the valve housing via passages 140, the air chamber being preferably filled with filtering material so as to filter the air flow into the valve chamber and therefore into the motor bellows chambers.

The control valve structure is preferably supported on the pitman arm connected end portion of the steering drag link 12 by means of an inverted L-shaped bracket member generally designated BM having a horizontal segment 142 to which the valve housing 110 is attached as by studs 143 threaded into a pair of spaced holes 144 formed in cylindrical interconnecting portions 145 in the valve housing, and a vertical segment 146 which is secured to the drag link as by a pair of laterally disposed clamp bolts 147. In this way the valve structure is mounted on the drag link for movement together. Secured to the upper end of the valve shaft as by a splined connection 149 and nut 150 is an external actuating arm 151 and which overlies a portion of the valve housing in parallel relation thereto with its free end in alignment with the axis of the drag link. This free end is connected by a commercial ball-joint 152 to a link 153 which in turn is connected as by a similar commercial ball-joint 154 to the upper side of the ball end 155 of the aforenamed pitman arm 10 whereby limited relative movement of the ball end of the pitman arm with respect to the drag link imparts corresponding movement to the arm 151 thereby moving the valve shoe 121 an equal distance since the internal and external arms 115, 151 respectively of the control valve are of equal length from a common axis coaxial with the valve shaft 114.

The ball end 155 of the pitman arm 10 operably projects through a suitable opening 156 in the upper side of the hollow or chambered end 157 of the drag link. This ball end is disposed in a double acting centralizing mechanism or device generally designated CD and comprises: a pair of longitudinally spaced centralizing star-shaped flat springs 158 each having a central hole 159 of such diameter as to receive only a portion of the spherical surface on opposite sides of the ball end 155 therein. The hollow terminating end of the drag link 12 is closed at its inner end by a wall 160 having a coaxial projection 161 projecting inwardly therefrom in normally spaced relation with respect to the full diameter of the ball end of the pitman arm, and the open end of the hollow is closed by a removable plug 162 having a coaxial projection 163 projecting inwardly therefrom in normally spaced relation with respect to the opposite side of the full diameter of the ball end of the pitman arm, and a split retaining ring 164 engaging an internal groove 165 adjacent the open end of said hollow prevents displacement of the plug from its normal closing position. The diametrically opposed portions on the pitman arm ball end and confronting projections produce what may be termed two pairs of cooperating "abutment-engaging elements" normally spaced by said springs 158 to centralize the ball end 155 with respect to the chamber 157.

The aforesaid spaces normally obtaining on opposite sides of the full diameter of the ball end of the pitman arm 10 with respect to the projections 161, 163 define the relative operating movement of the pitman arm 10 with respect to the drag link 12 to operate the control valve element 121 to its two operating "on" positions to activate the said motor to assist in effecting a right or left turn of the dirigible wheels of the vehicle as the case may be. The holes 159 in the springs 158 maintain the ball end 155 on the pitman arm substantially coaxial with respect to the drag link, and are preferably installed under tension to urge the ball end to its normal spaced centralized relation with respect to said projections 161, 163 wherein the control valve shoe 121 is disposed as shown in FIGURE 11 venting each cooperating pair of motor chambers to atmosphere and thus inactivating the motor M when the steering wheel is halted during curved or straight line driving of the motor vehicle. Each of the springs 158 is preferably formed with a central ring-like segment or web 166 from which four equally spaced resilient legs 167 project outwardly to produce the springy characteristic of said springs.

Cooperating with said centralizing device CD to yieldably stabilize the pitman arm 10 and drag link 12 in "neutral" position corresponding to halted status of the steering wheel at any position in the full range of steering control, is a valve detent mechanism or device generally designated VD which comprises: a movable plunger or detent 170 having a cylindrical stem 171 terminating at its inner end in a rectangular-shaped head 172 in a T-formation, the underside of said head defining an abutment portion 172a, a cylindrical bore 173 through a projection 174 having an upper inner surface 174a defining another abutment portion normally spaced from portion 172a a pair of converging vertical sides, on the end of the valve housing opposite its cover, a flat 175 normally contiguous to the upper side of the head 172, said flat terminating the pivoted end of the valve actuating arm 115 in spaced disposition with respect to said pivotal axis and normal to an imaginary line coaxial with the axis of said bore 173 and intersecting said pivotal axis, a blind axial bore 176 in said stem 171, a normally preloaded spring 177 disposed in said blind bore and reacting between the closed end of said blind bore and a plug 178 engaged with a threaded portion 179 terminating the outer end of the bore 173, to facilitate assembly and disassembly of said spring from the exterior of the valve housing 110. The said abutment portions 172a—174a when engaged define the relative operating movement of the valve body and element 110, 121 respectively, in opposite directions from neutral position shown in FIGURE 11.

Operation

The manner in which my improved vacuum-operated steering booster M functions is believed manifest from the foregoing description. However, in the interest of further clarifications a more detailed consideration will be given to its operational cycles as follows:

Assuming a condition at any instant when the dirigible wheels (not shown) of the motor vehicle illustrated fragmentarily at 86, 104, the position of the flexible power bellows PB and steering linkage shown in part at 10, 11, 12 and 101 connecting the vehicle wheels thereto will be as shown in FIGURES 1 and 2, with the parts of the master control valve mechanism CV in their relative positions (see FIGURE 11) corresponding to "Neutral" or straight ahead driving of the vehicle. At this instant, that is, with the control valve CV in the position of FIGURES 1 and 11, the vacuum conducted preferably from vacuum tank VT to the valve chamber 126 via port 128 and conduit means 130, the latter being preferably connected to the inlet-manifold of the engine to provide stored vacuum available for limited actuation of said booster M during those times when the engine throttle is open during parking of the vehicle wherein production of vacuum is appreciably reduced due to such open throttle condition causing proportional rise of pressure within the engine inlet-manifold IM. At this point of the operating cycle preliminary to the booster M becoming energized to assist in turning the dirigible wheels of the vehicle in the selected direction of vehicle movement, vacuum is confined within the valve chamber 126, and therefore, cut off from ports 127 and 129 and conduit means 131, 132 respectively to the servomotor chambers 77, 75 and 74, 76 in which equivalent pressures exist thus inactivating said servomotor with the control valve CV in its neutral "off" position of control shown in FIGURES 1 and 11, and when said control valve is moved from its normal "off" position to either of its two operating "on" positions of control shown by full and dashed lines respectively in FIGURE 13, differential pressures are established across the pair of power assemblies PA¹ and PA² to move them simultaneously in the selected direction in cooperation with the turning direction of the steering wheel (not shown) to activate said servomotor M to provide power assistance to manual effort applied to such steering wheel, to steer the vehicle in a corresponding direction, that is, to the right or left of a straight ahead path of movement.

Should the operator of the automotive vehicle or like machine having steered ground engaging members or wheels, desire to negotiate a turn to the "right," that is deflect the steered members (not shown) to the right from the driver's viewpoint, it is only necessary for him to rotate the steering wheel (not shown) in a clockwise direction. Rotation of the steering wheel to the operator's right, products rotation of the pitman arm 10 in the required direction relatively to the drag link 12, such relative movement being accommodated by the said centralizing device CD, to effect displacement of the valve element 121 relatively to its valve seat 113, best demonstrated in FIGURE 13, to place the working land 135 to the left of port 127 thereby establishing fluid communication between the vacuum chamber 126 and conduit means 131 to evacuate air from chambers 77, 75 in the bellows of the servomotor to establish differential pressures on corresponding sides of the two power members PA¹ and PA² to move these members and connected output member 48 to the right as viewed in FIGURES 1 and 2 to assist the operator in effecting a right turn of the vehicle to the extent that manual turning force is increased on the steering wheel. If such manual force is halted at any point during such right turning, the energized status of the servomotor power members will adjust minutely further relatively to the right to effect "lapping" of the working land 135 with respect to its cooperating port 127 closely followed by exposure of said port to atmosphere via said air chamber 137 and air inlet chamber 138 as best demonstrated in FIGURE 11 to establish "Neutral" condition of the control valve CV wherein the motor M is inactivated, the said port being of slightly less width than the width of said working land, thereby establishing the servomotor in a momentary "holding" position corresponding substantially to the halted position of the steering wheel to maintain the turning radius of the vehicle as previously established. This "lapped" status of the working land 135 with respect to port 127 or working land 136 with respect to port 129 can only be momentary as stated above, since the detent device VD is continuously urging the valve body 110 and element 121 toward their respective normal central positions shown in FIGURE 11 wherein ports 127, 129 are connected to atmosphere via the air chambers 137, 137' (see FIGURE 14) at each end of the valve element 121. However, during such "lapped" relationship of either port 127, 129 the operating status quo of the servomotor is maintained until the active port is vented to atmosphere in the manner described. Accordingly, the driver is always in full control of the direction in which the vehicle is traveling but with considerably reduced effort required to manipulate the dirigible wheels, particularly when the vehicle is at rest or being parked. If a right or left turn is desired, the driver merely has to rotate the steering wheel in the selected direction, which displaces the pitman arm 10 relatively with respect to the drag link 12 which carries through to the ball-joint and linkage connection 152, 153, 154 to the outer valve actuating arm 151 to the inner valve actuating arm 115, thence to the valve shoe 121 to displace the latter from its "Neutral" position shown in FIGURES 1 and 11 to either of its two selective operating positions shown in FIGURE 13 to steer the vehicle with considerably reduced effort resulting from the differential pressures effective across the pair of power members aforesaid during turning movement of the steering wheel which, if halted at any point in the full range of steering control, results in the valve parts assuming relative positions shown in FIGURE 11 wherein the motor M is inactivated.

Operationally, the aforesaid valve detent device VD plays an important role in the "Neutral" setting of the steering linkage and connected ground wheels in cooperation with the centralizing device CD associated with the ball end 155 of the pitman arm 10. The detent device VD, due to the bias of the rectangular head of the detent 170 into full surface contact with its cooperating flat 175 carried by the actuating arm 115, serves to yieldably stabilize the valve shoe 121 in its normal "off" position as shown in FIGURES 1 and 2 in cooperation with the centralizing device CD to correlate both the valve shoe 121 and pitman arm 10 in their respective normally "centralized" positions when turning of the steering wheel is halted. Accordingly, these two devices provide a force in conjunction with the resilient mounting of the servomotor on the vehicle frame opposing the manual movement of the steering wheel to supplement reactionary forces from the dirigible wheels to restore the valve element 121 and steering pitman arm 10 to balance "Neutral" positions as portrayed in FIGURES 1 and 2. These reactionary forces increase substantially proportionally to vehicle speed thus, if further turning, for example, to the right of the vehicle is desired, the operator must at slower speeds of the vehicle increase his effort at the wheel to maintain the valve element 121 in a position "cracking" the selected port 127, 129 controlled thereby so that the servomotor M continues energized to assist in such right turning effort to completion thereof, whereupon, such reactionary forces from the dirigible wheels, centralizing device CD, resilient mounting of the servomotor and the detent device VD upon release of the steering wheel induce relative movement between the valve housing 110 and valve element 121 to restore balanced condition of the valve element with respect thereto wherein the working lands 135, 136 uncover the ports 127, 129 respectively to place them in communication with their respective conduit means 131, 132 to place each pair of motor chambers in communication with atmosphere via air inlet chamber 138 thus adjusting the pair of power members PA¹ and PA² to their respective medially disposed de-energized positions as shown in FIGURE 2.

During such controlled displacement of the valve shoe 121 to either of its operating "on" positions shown in FIGURE 13, the appropriate pairs of chambers 77, 75 and 74, 76 are selectively connected to atmosphere and to vacuum respectively via the ports 127, 129 in the control valve cover, conduits 131, 132, the longitudinal passageways 57, 58 in the fluted cylindrical member 56 and interconnecting cross passageways 60, 61, 62 in the piston rod 48. This novel arrangement of the fluid connections between the pairs of chambers within the servomotor bellows PB eliminates exterior plumbing, connections, etc., to produce a simple unitary assembly of the servomotor with double-power capacity for the diameter of the power bellows used. Furthermore, this novel construction of the power bellows PB to utilize tandem power members within a protecting cylindrical casing formed with two semi-circular sections or otherwise, eliminates the need for lubricating the moving parts of such novel servomotor, and completely protects such parts from weather conditions and objects thrown up from the vehicle ground wheels. This servomotor is a noteworthy contribution to the art since for the first time a low-cost power steering system is provided for the motoring public and which is characterized by long service life free of major maintenance costs and which utilizes the vacuum produced within the inlet-manifold of the associated engine thereby imposing no load on the engine to operate such steering system. A further important advantage of the present steering system is its utility in what is currently termed "small cars" which are deprived of power steering assist due to the high cost of present hydraulic systems provided for higher priced and larger vehicles of current production.

From the foregoing operational cycles it is manifest that movement of the valve shoe 121 to the left to the position shown in FIGURE 13 is effective to control the servomotor M to assist in making a "right" turn, while movement in the opposite direction from "Neutral" to the dashed line position is effective to control the servomotor M to assist in making a "left" turn.

For purposes of exemplification, only the operating cycle of my vacuum-assisted steering system has been explained for executing a "right" turn. For accomplishing a left turn, the steering wheel would be rotated in a counterclockwise direction from the driver's viewpoint, causing opposite relative positioning of the valve element 121 shown in dashed lines in FIGURE 13 with respect to its housing 110 wherein the centering springs 158 would be oppositely deflected from their normal preloaded status to accommodate relative movement of the ball end 155 of the pitman arm 10 toward projection 161. Such movement of the valve shoe 121 would connect the vacuum chamber 126 in the valve shoe 121 to the port 129 since the working land 136 lies to the right of said port while the other port 127 is maintained open to the interior of the valve housing 110 and atmosphere via the air chamber 137 and air inlet chamber 138 by reason of the working land 135 lying to the right of port 127. Thus, the forward pair of motor chambers 74, 76 are connected to the vacuum valve chamber 126 and the other rear pair of motor chambers 77, 75 are connected to atmosphere via said port 127 to produce differential pressures across the power members PA$^1$ and PA$^2$ to effect their movement simultaneously to the left as viewed in FIGURE 2 to render power assistance to manual effort applied to the steering wheels to change the direction of movement of the vehicle to the left as is understood.

It should be recognized from the present disclosure on reference to FIGURE 8 that the spaces normally obtaining between the projections 161, 163 on opposite sides of the full diameter of the ball end 155 of the pitman arm 10, establish the limits of relative movement of the pitman arm with respect to the steering linkage to operate the control valve CV to its two operating "on" positions best demonstrated in FIGURE 13. When this relative movement is taken up as a result of a right or left turn from normal "Neutral" position, wherein the selected projection 161, 163 engages the pitman arm ball end, then the driver may apply manual effort directly to the steering linkage system to steer the ground members of the vehicle in cooperation with the servomotor M or independently thereof should power failure occur due to loss of vacuum or for other reasons causing the motor M to become ineffective to assist in such manual steering effort.

The central holes 159 in the centralizing springs 158, serve to maintain the ball end of the pitman arm 10 in substantially coaxial disposition with respect to the connected end of the drag link 12, and to insure correct operating alignment with the springs 158 disposed on opposite sides of the ball end 155.

Accordingly, the mechanism comprising the projections 161, 163, springs 158 and ball end 155 is generally designated a "centralizing device" which is capable of stabilizing the steering linkage system in "Neutral" normal position with respect to the connected end of the steering pitman arm 10 upon manual turning effort being relieved from the steering wheel, and it is this novel "centralizing device" which cooperates with the "detent device" operably incorporated in the control valve CV to yieldably stabilize the movable valve element 121 in its corresponding positions of control with respect to those of the steering linkage system, namely; neutral, right and left positions. Such stabilizing action being induced by the aforesaid reactionary forces transmitted by the rubber collars 81, 82, and the above two devices CD and VD when disposed out of their respective normal positions shown in FIGURES 1 and 2 and the ground wheels, as a consequence of steering the vehicle to either the right or left.

Thus, in like manner to a right turn, the devices CD and VD and rubber mounting collars 81, 82 constantly urge the valve shoe 121 and housing 110 toward balanced relative positions as portrayed in FIGURE 11, but while the valve shoe 121 is maintained in any degree of "cracking" the port 129 as shown in FIGURE 13 in dashed lines, the servomotor M power members are being urged to the left from their medial neutral positions as viewed in FIGURE 2 to turn the dirigible wheels in cooperation with manual force exerted at the steering wheel. This cooperative biasing action effective when the vehicle wheels are out of straight path guidance of the vehicle is also augmented by the reaction from the dirigible wheels in contact with the road surface tending at all times to assume a straight path of travel from an arcuate path effective when a turn is being executed.

It is thus seen that the steering servomotor M assists in turning the dirigible wheels of the vehicle and thus reduces driver turning effort in executing a right or left turn. The higher the resistance to turning between the roadbed and the steering wheels, the more the control valve CV is displaced to a wider open position, since the amount of valve displacement and, consequently, the amount of pressure differential effective in the servomotor is dependent upon the resistance to turning, the driver is helped by smooth vacuum assistance at all times. As the driver ceases to apply steering effort to the steering wheel and then relaxes the wheel, the control valve CV is forced back to its neutral "off" position shown in FIG. 11 by its detent device DV and roadbed reaction through the steering linkage in cooperation with the normalizing reaction of the centralizing mechanism CD incorporated in the latter, to place the dirigible wheels on a straight course. When this happens the differential pressures are equal on both sides of the tandem power assemblies PA$^1$, PA$^2$ and the steering geometry of the vehicle causes the dirigible wheels to return to the straight-ahead position.

Typical manual steering gear effort without power assistance requires a range of manual force at the steering wheel varying, for example, from approximately 10# to 50#, to steer the vehicle at ordinary cruising speeds of the vehicle, cornering and when parallel parking. It is, therefore, the purpose of the present vacuum-operated steering system to provide power assistance during low vehicular speed steering and when parking, the latter including turning of the dirigible wheels while the vehicle is standing, whereby substantially reduced effort at the steering wheel to as much as fifty to sixty percent of the full manual force normally used through the full steering range of the vehicle while standing. To this end, preloaded rating of the centering springs 158 and the valve detent spring 177 is somewhat critical to establish the manual effort on the steering wheel at substantially 8 to 10# to turn the dirigible wheels while the car is standing with the servomotor doing substantially one-third to one-half or more of the total steering effort. Accordingly, the combined weight of the centering springs 158 and the valve detent spring 177 determines the amount of initial manual effort at the steering wheel required to inaugurate power assistance from the servomotor M. For small-light-cars, the present vacuum steering system operating with only one-half of the effort supplied by the servomotor M would be commercially acceptable.

The present invention contemplates use of a vacuum tank or accumulator VT shown in FIGURE 1 in the conduit means 130 to provide a more uniform production of vacuum available to the control valve CV thus insuring operativeness of the servomotor M when the engine throttle is momentarily opened to maneuver the vehicle into the selected parking space.

The invention further contemplates that the servomotor M may be divided at its medial stationary head to form with either of the end heads thereof a motor wherein only one of the illustrated power members is employed; that the flexible bellows of the servomotor M may be constructed of two longitudinal sections divided at the medial stationary head to facilitate assembly and to reduce manufacturing cost thereof; and that the complemental working surfaces between the valve element 121 and valve seat 113 may be flat rather than arcuate as illustrated in the drawings.

The control valve CV of the present invention possesses a unique feature with respect to maintaining the slide valve element 121 in sealing engagement with its cooperating seat 113 on the valve body 110. This sealing relation is effected jointly by the biasing action of the spring means 122 and differential pressures acting across said element as a consequence of the vacuum chamber 126 being continuously subject to vacuum thus drawing the valve element 121 toward its mating seat 113 at all operating positions therebetween.

The simplicity and economy of the vacuum valve construction CV and the mounting thereof on the drag link 12 or other element actuated in part by the steering servomotor M disclosed herein, enables use of vacuum-power steering in vehicles of many types, particularly the light-small-car in which hydraulic-power steering is too costly therefore uneconomical.

The present invention is directed to a booster steering mechanism for motor vehicles and the like wherein a new and novel type of booster motor and control valve are employed cooperatively to provide highly desirable characteristics in steering wheel operation during power-boost. Aside from the use of the said motor and control valve in a booster steering system, these two novel components are capable of application in other uses jointly or separately, and therefore, such motor and control valve per se form the subject-matter of certain of the claims appended hereto.

Considering the terminology used in the foregoing description and in the appended claims, the identifying expressions and/or terms employed are intended to convey meanings which include the range of reasonable equivalents in a patent sense. For example, the expressions "servomotor," "motor," "booster," "servo-mechanism," "power cylinder," "power device," "power-assistor," "actuator," "vacuum-booster," "vacuum-assistor," "differential-pressure actuator," etc., are intended to include any casing and/or chamber having a pressure-responsive movable assembly therein, whether such assembly includes a solid piston, a flexible diaphragm, a flexible bellows, or some other member serving the same purpose. The terms "front," "rear," "right," "left," "straight ahead," "up," "down," "bottom," "top," and other directional words or characters are intended to have only relative connotation for convenience in describing the structure as illustrated, and are not intended to be interpreted as requiring any particular orientation with respect to associated structure external to the present disclosure except such terms as may relate to the path of movement of the vehicle.

The preferred embodiment of the invention has been illustrated and described. It is to be understood, however, that the invention contemplates any and all modifications, substitutions, variations and arrangements of the cooperating elements thereof that may fall within the purview of the claims hereunto appended.

Having thus described by invention, I claim:

1. A pressure differential operated servomotor comprising: a cylindrical casing formed of two semicircular sections to provide two spaced stationary end heads and a medial stationary partition head defining two isolated chambers constantly vented to atmosphere via openings through said sections; a circular opening through said medial head and one of said end heads in coaxial disposition with respect to the axis of said casing; ring-like flexible sealing elements mounted in said openings; an output member operably projecting through said seals to the exterior of the one end head; a flexible bellows disposed within said casing and provided with three longitudinally spaced external beads defining the medial portion thereof and the ends thereof, and an external and internal circularly aligned flange integral with said bellows intermediately of the medial bead and each of said end beads aforesaid; a pair of power units movably disposed in tandem relationship within said casing, and normally occupying a medial position with respect to said atmospheric chambers respectively, said units each comprising a pair of juxtaposed plates having their peripheral marginal portions offset to form an external annular groove adapted to receive said internal flange on the bellows in air-tight sealed relationship; means for interconnecting each of said pairs of plates with said output member to move as a unit therewith; a pair of opposed variable power chambers defined by each of said pairs of plates in the interior of said bellows in circular alignment with said atmospheric chambers respectively; fluid distributing means incorporated in said output member for interconnecting said power chambers in pairs on the same sides of said pairs of plates; a passage through each of said end heads for establishing communication from the exterior of said casing with the two power chambers adjacent said end heads respectively; means for joining each of said pairs of plates to form their respective power units; and three semicircular internal channels formed in each of said casing sections in circular alignment with said three stationary heads, said channels being adapted to receive the three annular beads on said bellows and the peripheral marginal portions of said heads respectively, and thereby anchor the bellows and heads to the interior of said casing in a unitary assembly.

2. A servomotor constructed in accordance with claim 1 in which said means for connecting the pair of plates to the output member comprise: outwardly offset coaxial portions in each pair of plates in confronting relation to form a circular space therebetween; a circular opening through the central portion of said offset portions through which said output member projects; an external annular groove on said output member in circular alignment with said space; a split thrust ring engaging said groove to form oppositely disposed shoulders which are engaged by the marginal portions of said opening in air-tight sealed relation; and a ring-like sealing member disposed between the outer surface of said thrust ring and the internal periphery of said space to effect an air-tight seal between each pair of plates and associated thrust ring.

3. A pressure differential operated servomotor comprising: a cylindrical casing having a pair of longitudinally spaced stationary end heads and a medially disposed stationary head; a movable power assembly normally disposed medially of each end head and said medial head in said casing to divide the interior of said casing into four variable pressure chambers normally vented to atmosphere; a circular opening through one of said end heads and said medial head and disposed in coaxial relationship; a ring-like flexible sealing member mounted in said openings; an output member operably projecting through the seals in the openings in said medial and one end head to the exterior of the latter; means for connecting said power assemblies in tandem relationship to said output member to move as a unit relatively to said four chambers; fluid distributing means incorporated in said output member to connect said four chambers in pairs disposed on the same sides of said tandem power assemblies; and a fluid conduit connection on each head end of said casing in constant communication with the chamber adjacent to said end heads and normally venting said four chambers to atmosphere via said fluid distributing means to inactivate said servomotor.

4. A pressure differential servomotor constructed in accordance with claim 3 in which each of said power assemblies comprises: a pair of connected juxtaposed plates formed with an annular peripheral channel; a flexible bellows interconnecting one of said casing end heads and the medial head, the medial portion of said bellows being formed with an internal flange adapted to engage the aforesaid peripheral channel in air-tight sealed relationship thereby enabling the pair of plates and medial portion of the bellows to move as a unit; two external annular beads formed on the bellows in longitudinally spaced relationship; an external annular ridge on said bellows intermediate of said annular beads, in circular alignment with said flange for slidably engaging the inner cylindrical surface of said casing to stabilize said power assembly in a straight line of motion; and a pair of longitudinally spaced internal channels formed in said casing, said channels being adapted to receive the two annular beads aforesaid respectively and the peripheral marginal portions respectively of said end and medial heads to produce an airtight unitary assembly.

5. A pressure differential servomotor constructed in accordance with claim 4 in which said connecting means between each of the power assemblies and the output member comprise: an external annular groove formed on said output member in circular alignment with said pair of plates; a split-type contractible thrust ring engaging said last-named groove; circular coaxial openings through said pair of plates; outwardly offset marginal portions defining said coaxial openings, to provide an annular space therebetween for reception of the exposed portion of said thrust ring therein; and a plurality of fasteners adapted to connect said pair of plates together to move as a unit with said output member.

6. A pressure differential operated servomotor comprising: a pair of stationary end heads and a medially disposed stationary head in longitudinally spaced relation with respect to one another; a pair of movable heads, one of which is medially disposed normally between one of the end heads and said medial head and the other movable head being normally disposed between the other end head and said medial head to provide a tandem power assembly; a deformable bellows interconnecting said three stationary heads and the two tandem movable heads, the latter heads defining therewith four internal variable pressure chambers connected in pairs on corresponding sides of said pair of movable heads, said medial head and one of said end heads each having a central opening therethrough; a flexible ring-like sealing member mounted in each of said openings; a central opening through each of said movable heads in coaxial disposition with respect to the openings through said medial and one end heads; an axially elongated rigid member projecting through the openings in said movable heads and the seals mounted in said openings in said medial and one end head to the exterior of the latter; means for rigidly connecting said movable heads to the rigid member for sliding movement as a unit; means biasing said movable heads to their normal medial positions aforenamed wherein said servomotor is de-energized as a consequence of said four chambers being connected to atmosphere thus balancing pressures within said chambers; fluid distributing means incorporated in said rigid member to interconnect said chambers in pairs as aforesaid; and fluid conduit means for connecting the chambers adjacent said end heads to the exterior of said servomotor.

7. A pressure differential servomotor comprising: a cylindrical casing formed of two semi-circular sections having a pair of longitudinally spaced stationary heads and a movable head having a normal position medially of said stationary heads; a deformable bellows interconnecting said heads and defining therewith an internal pressure chamber on each side of said movable head; an opening through the central portion of one of said stationary heads in coaxial disposition with respect to the axis of said casing; a deformable packing seal mounted in said opening; a rigid output member connected at one end to said movable head for movement as a unit therewith, and operably projecting beyond the exterior of said casing through the packing seal; and means biasing said movable head to its normal medial position.

8. A servomotor according to claim 7 in which said pair of chambers are normally vented to atmosphere to balance pressures therein to inactivate said servomotor, and in which differential pressures are establishable to move the movable head in one direction only.

9. A servo-booster comprising: a power cylinder closed at both ends except for an opening through one of said ends; a partition dividing said casing into two sections except for an opening through the center thereof in coaxial disposition with respect to the opening through said one end of said power cylinder; two power members arranged in tandem, each in one of the sections of the power cylinder and normally disposed medially thereof; an opening through each of said power members in coaxial disposition with respect to one another and to the axis of said power cylinder; a rigid output member extending through the openings in said power members and in the partition and said one end of said power cylinder to the exterior thereof; means for rigidly connecting a portion of said power members to said output member thereby interconnecting the two power members in a unitary power assembly; fluid distributing means incorporated in said output member for interconnecting corresponding sides of said power members; and conduit means for interconnecting said sections to the exterior of said power cylinder.

References Cited in the file of this patent

UNITED STATES PATENTS

| | | |
|---|---|---|
| 1,810,766 | Hohulin | June 16, 1931 |
| 2,127,679 | Dudley | Aug. 23, 1938 |
| 2,165,096 | Frenchette | July 4, 1939 |
| 2,221,199 | Peo et al. | Nov. 12, 1940 |
| 2,227,657 | Linsley et al. | Jan. 7, 1941 |
| 2,313,704 | Hey | Mar. 9, 1943 |
| 2,565,929 | Onde | Aug. 28, 1951 |
| 2,601,511 | Gaffney | June 24, 1952 |
| 2,702,023 | Seeloff | Feb. 15, 1955 |
| 2,707,523 | Sisley et al. | May 3, 1955 |
| 2,757,748 | MacDuff | Aug. 7, 1956 |
| 2,852,921 | Ayers | Sept. 23, 1958 |
| 2,889,817 | Hard af Segerstad | June 9, 1959 |